United States Patent
Zhao et al.

(10) Patent No.: US 12,277,121 B2
(45) Date of Patent: Apr. 15, 2025

(54) DATA AUGMENTATION SYSTEM, DATA AUGMENTATION METHOD, AND INFORMATION STORAGE MEDIUM

(71) Applicant: RAKUTEN GROUP, INC., Tokyo (JP)

(72) Inventors: Chen Zhao, Tokyo (JP); Yuki Nakayama, Tokyo (JP); Koji Murakami, Eastchester, NY (US)

(73) Assignee: RAKUTEN GROUP, INC., Tokyo (JP)

( * ) Notice: Subject to any disclaimer, the term of this patent is extended or adjusted under 35 U.S.C. 154(b) by 35 days.

(21) Appl. No.: 18/337,061

(22) Filed: Jun. 19, 2023

(65) Prior Publication Data

US 2024/0004880 A1  Jan. 4, 2024

Related U.S. Application Data

(60) Provisional application No. 63/367,323, filed on Jun. 29, 2022.

(51) Int. Cl.
*G06F 16/2455* (2019.01)
*G06F 16/2453* (2019.01)
*G06N 3/0442* (2023.01)
*G06N 3/0455* (2023.01)

(52) U.S. Cl.
CPC .... *G06F 16/2455* (2019.01); *G06F 16/24542* (2019.01); *G06N 3/0442* (2023.01); *G06N 3/0455* (2023.01)

(58) Field of Classification Search
CPC ........... G06F 16/2455; G06F 16/24542; G06F 16/3322; G06N 3/0442; G06N 3/0455; G06N 3/0475; G06N 3/088; G06N 3/047
See application file for complete search history.

(56) References Cited

U.S. PATENT DOCUMENTS

| | | | |
|---|---|---|---|
| 2019/0236139 A1* | 8/2019 | DeFelice | G06N 3/044 |
| 2020/0279159 A1* | 9/2020 | Iwakura | G06F 40/295 |
| 2022/0058227 A1* | 2/2022 | Balakrishnan | G06Q 30/0627 |
| 2022/0092096 A1* | 3/2022 | Yuan | G06F 40/295 |
| 2022/0180198 A1 | 6/2022 | Miura et al. | |
| 2023/0402065 A1* | 12/2023 | Gu | G11B 27/34 |
| 2024/0185168 A1* | 6/2024 | Johar | G06Q 10/08 |

FOREIGN PATENT DOCUMENTS

| | | |
|---|---|---|
| JP | 2020-140676 A | 9/2020 |
| WO | 2021038886 A1 | 3/2021 |

OTHER PUBLICATIONS

Office Action of Jun. 4, 2024, for corresponding JP Patent Application No. 2023-091581, pp. 1-4.

* cited by examiner

*Primary Examiner* — Anhtai V Tran
*Assistant Examiner* — Xiaoqin Hu
(74) *Attorney, Agent, or Firm* — HEA Law PLLC

(57) ABSTRACT

Provided is a data augmentation system including at least one processor configured to: acquire a first search query including a first named entity, which was actually input in a search executed in a past; execute training of a first model that outputs a second search query including a virtual second named entity, which is different from the first named entity, based on the first search query; and execute data augmentation based on the second search query output by the trained first model.

19 Claims, 12 Drawing Sheets

FIG.6

| URL OF WEB PAGE | WEB PAGE ATTRIBUTE | WEB PAGE NAMED ENTITY |
|---|---|---|
| URL1 | Brand | white wind |
| URL2 | Brand | great big spirit |
| URL3 | Color | black |
| . | . | . |
| . | . | . |
| . | . | . |

| FOURTH SEARCH QUERY | URL OF WEB PAGE | SEARCH DATE AND TIME |
|---|---|---|
| white wind engineer boots | URL1 | 2022/6/6 10:25:22 |
| great big spirit | URL4 | 2022/6/6 10:25:27 |
| XYZ rabo | URL5 | 2022/6/6 10:25:30 |
| ... | ... | ... |

| FIRST ATTRIBUTE | FIRST NAMED ENTITY |
|---|---|
| Brand | white wind |
| Brand | great big spirit |
| Color | black |
| ⋮ | ⋮ |

FIG.9

| FIRST SEARCH QUERY | FIRST ATTRIBUTE | FIRST NAMED ENTITY |
|---|---|---|
| white wind engineer boots | Brand | white wind |
| great big spirit black | Brand<br>Color | great big spirit<br>black |
| XYZ rabo | Brand | XYZ rabo |
| ⋮ | ⋮ | ⋮ |

| FIRST SEARCH QUERY | THIRD SEARCH QUERY |
|---|---|
| white wind | white wind |
| great big spirit | great big spirit |
| XYZ rabo | XYZ rabo |
| . . . | . . . |

DB5 white <B-BRAND> wind <I-BRAND> w <B-BRAND> h <I-BRAND> i <I-BRAND> t <I-BRAND> e <I-BRAND> w <I-BRAND> i <I-BRAND> n <I-BRAND> d <I-BRAND>

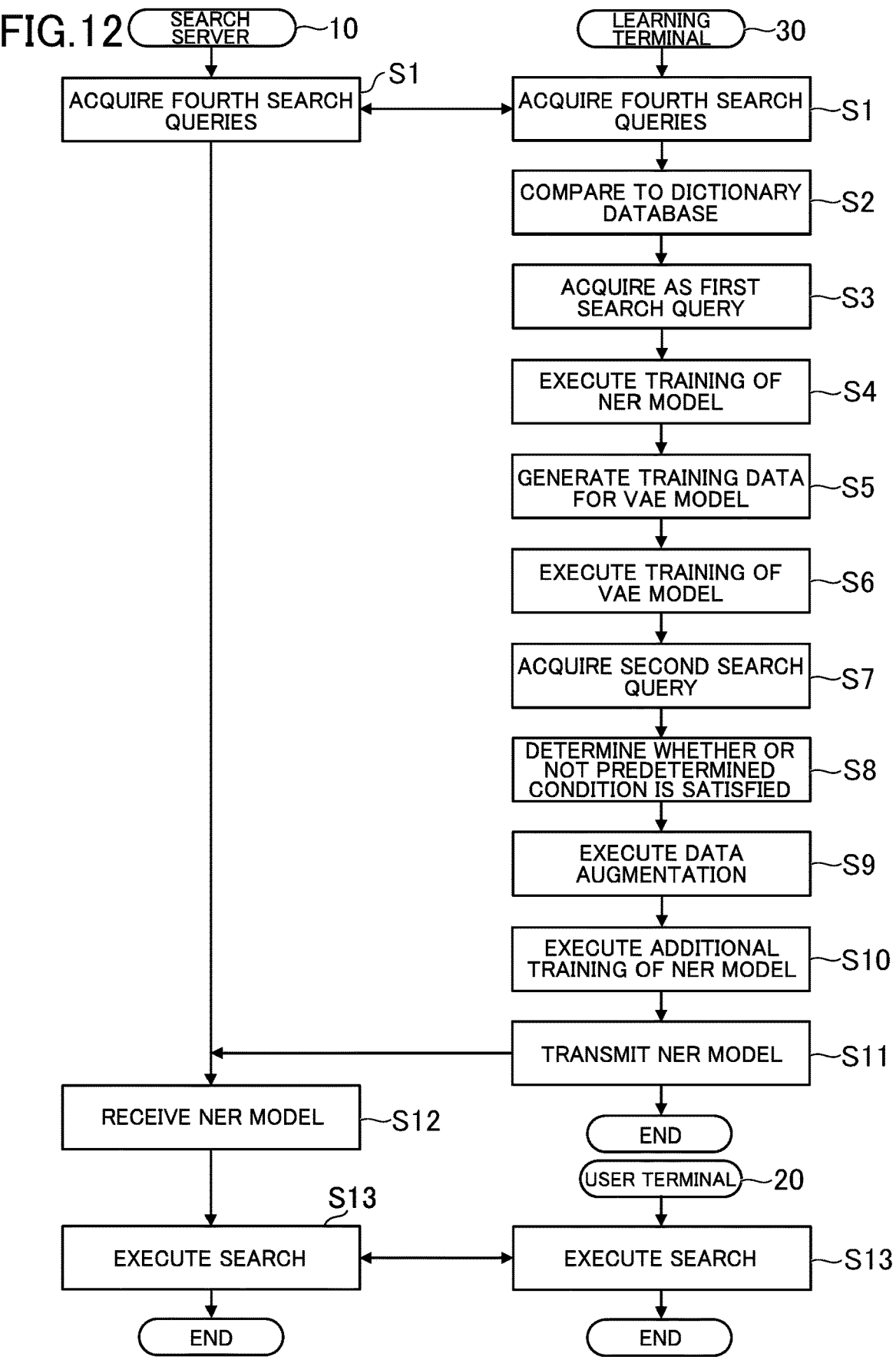

DATA AUGMENTATION SYSTEM, DATA AUGMENTATION METHOD, AND INFORMATION STORAGE MEDIUM

CROSS-REFERENCE TO RELATED APPLICATION

The present application claims priority from the U.S. provisional application No. 63/367,323, filed on Jun. 29, 2022, the disclosures of which are incorporated by reference herein.

BACKGROUND OF THE INVENTION

1. Field of the Invention

The present disclosure relates to a data augmentation system, a data augmentation method, and an information storage medium.

2. Description of the Related Art

Hitherto, in the field of natural language processing, there has been known a named entity recognition task (named entity extraction task) for recognizing (extracting) a named entity included in a character string. For example, in Japanese Patent Application Laid-open No. 2020-140676, it is described that, in order to recognize named entities that are difficult to be defined in a dictionary database, a machine learning method is used to cause a model that recognizes named entities to learn training data including various named entities.

In recent years, recognizing named entities included in search queries has also been investigated. However, when an attempt is made to recognize named entities included in search queries through use of the technology as described in Japanese Patent Application Laid-open No. 2020-140676, it is required to manually prepare a large amount of training data, thereby extremely consuming time and labor. This point is the same when search queries including named entities are prepared for purposes other than for preparing training data. For that reason, related-art technologies have required time and labor to prepare search queries including named entities.

SUMMARY OF THE INVENTION

One object of the present disclosure is to save time and labor to prepare search queries including named entities.

According to at least one embodiment of the present disclosure, there is provided a data augmentation system including at least one processor configured to: acquire a first search query including a first named entity, which was actually input in a search executed in a past; execute training of a first model that outputs a second search query including a virtual second named entity, which is different from the first named entity, based on the first search query; and execute data augmentation based on the second search query output by the trained first model.

BRIEF DESCRIPTION OF THE DRAWINGS

FIG. 6 is a table for showing an example of a search target database.

FIG. 7 is a table for showing an example of a search history database.

FIG. 8 is a table for showing an example of a dictionary database.

FIG. 9 is a table for showing an example of a training database for an NER model.

FIG. 10 is a table for showing an example of a training database for the VAE model.

FIG. 12 is a flow chart for illustrating an example of processing executed by the data augmentation system.

DETAILED DESCRIPTION OF THE INVENTION

1. Overall Configuration of Data Augmentation System

At least one embodiment of the present disclosure is described as an example of embodiments of a data augmentation system. In the at least one embodiment, a case in which the data augmentation system is used for a search service is taken as an example. The search service is a service for retrieving web pages based on a search query input by a user. A data augmentation system 1 can be used for any other purpose different from the search service. Examples of the other purpose are described later in modification examples.

Figure 1:
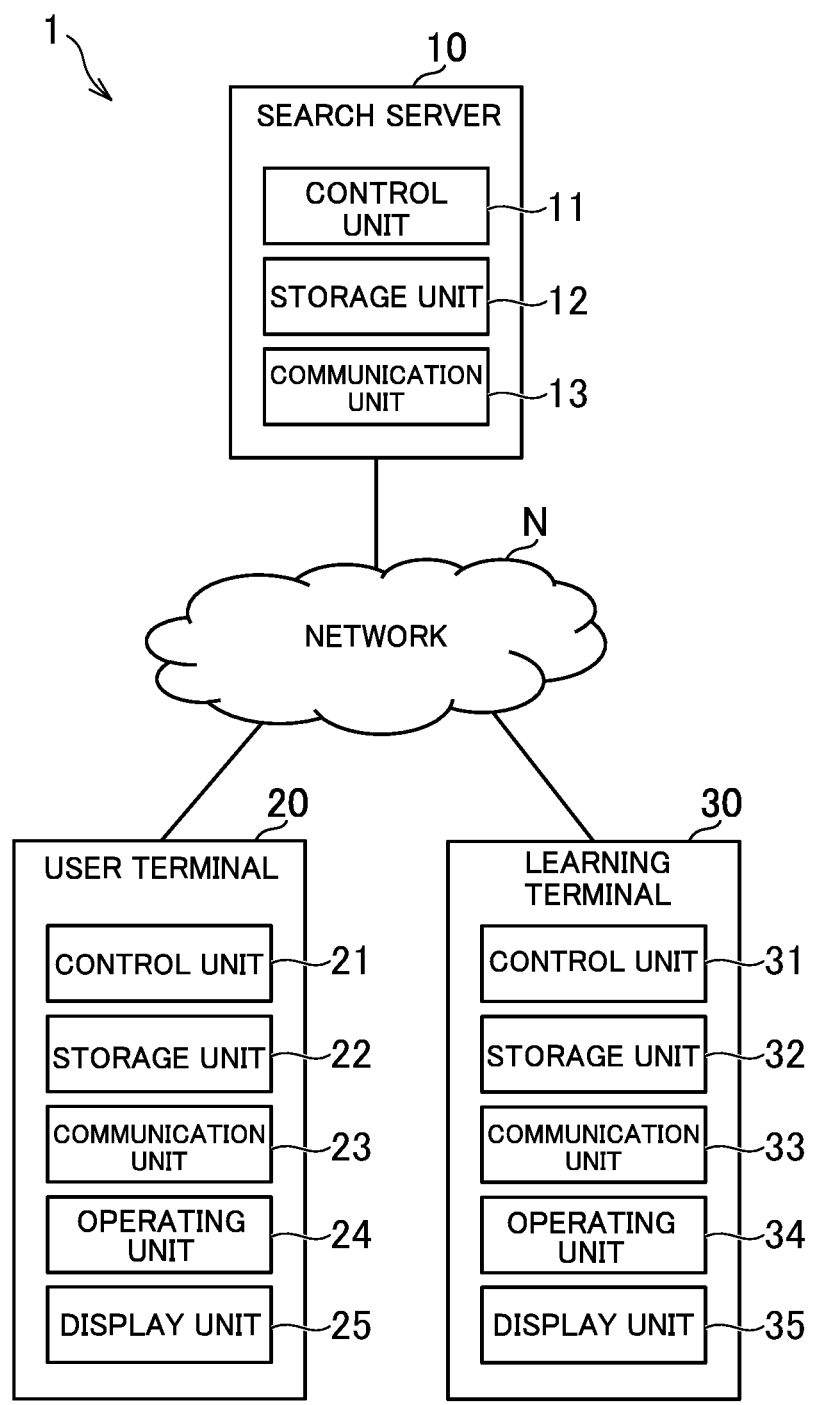
FIG. 1 is a diagram for illustrating an example of an overall configuration of a data augmentation system.

FIG. 1 is a diagram for illustrating an example of an overall configuration of the data augmentation system. The data augmentation system 1 includes, for example, a search server 10, a user terminal 20, and a learning terminal 30. The search server 10, the user terminal 20, and the learning terminal 30 are each connectable to a network N, which is the Internet, a LAN, or the like.

The search server 10 is a server computer that executes searches. A control unit 11 includes at least one processor. A storage unit 12 includes a volatile memory such as a RAM, and a non-volatile memory such as a flash memory. A communication unit 13 includes at least one of a communication interface for wired communication or a communication interface for wireless communication.

The user terminal 20 is a computer of a user who uses the search service. For example, the user terminal 20 is a personal computer, smartphone, a tablet terminal, or a wearable device. Physical configurations of a control unit 21, a storage unit 22, and a communication unit 23 may be the same as those of the control unit 11, the storage unit 12, and the communication unit 13, respectively. An operating unit 24 is an input device such as a touch panel or a mouse. A display unit 25 is a liquid crystal display or an organic EL display.

The learning terminal 30 is a computer that executes data augmentation. The data augmentation refers to newly generating, based on first data prepared in advance, second data different from the first data. The second data includes details similar to those of the first data. For example, the second data is obtained by at least partially changing the first data. A first search query described later corresponds to the first data. A second search query described later corresponds to the second data. In the at least one embodiment, data augmentation relating to training data for constructing a machine learning model is taken as an example.

For example, the learning terminal 30 is a personal computer, a server computer, or a tablet terminal. Physical configurations of a control unit 31, a storage unit 32, a communication unit 33, an operating unit 34, and a display unit 35 are the same as those of the control unit 11, the storage unit 12, the communication unit 13, the operating unit 24, and the display unit 25, respectively.

Programs stored in the storage units 12, 22, and 32 may be supplied thereto through the network N. Further, each computer may include at least one of a reading unit (for example, memory card slot) that reads a computer-readable information storage medium or an input-and-output unit (for example, USB port) for inputting and outputting data to/from an external device. For example, a program stored in the information storage medium may be supplied through at least one of the reading unit or the input-and-output unit.

Further, the data augmentation system 1 is only required to include at least one computer, and is not limited to the example of FIG. 1. For example, the data augmentation system 1 may include only the learning terminal 30 without including the search server 10 and the user terminal 20. In this case, the search server 10 and the user terminal 20 are present outside the data augmentation system 1. For example, the data augmentation system 1 may include the learning terminal 30 and another computer different from the search server 10 and the user terminal 20.

2. Outline of Data Augmentation System

Figure 2:
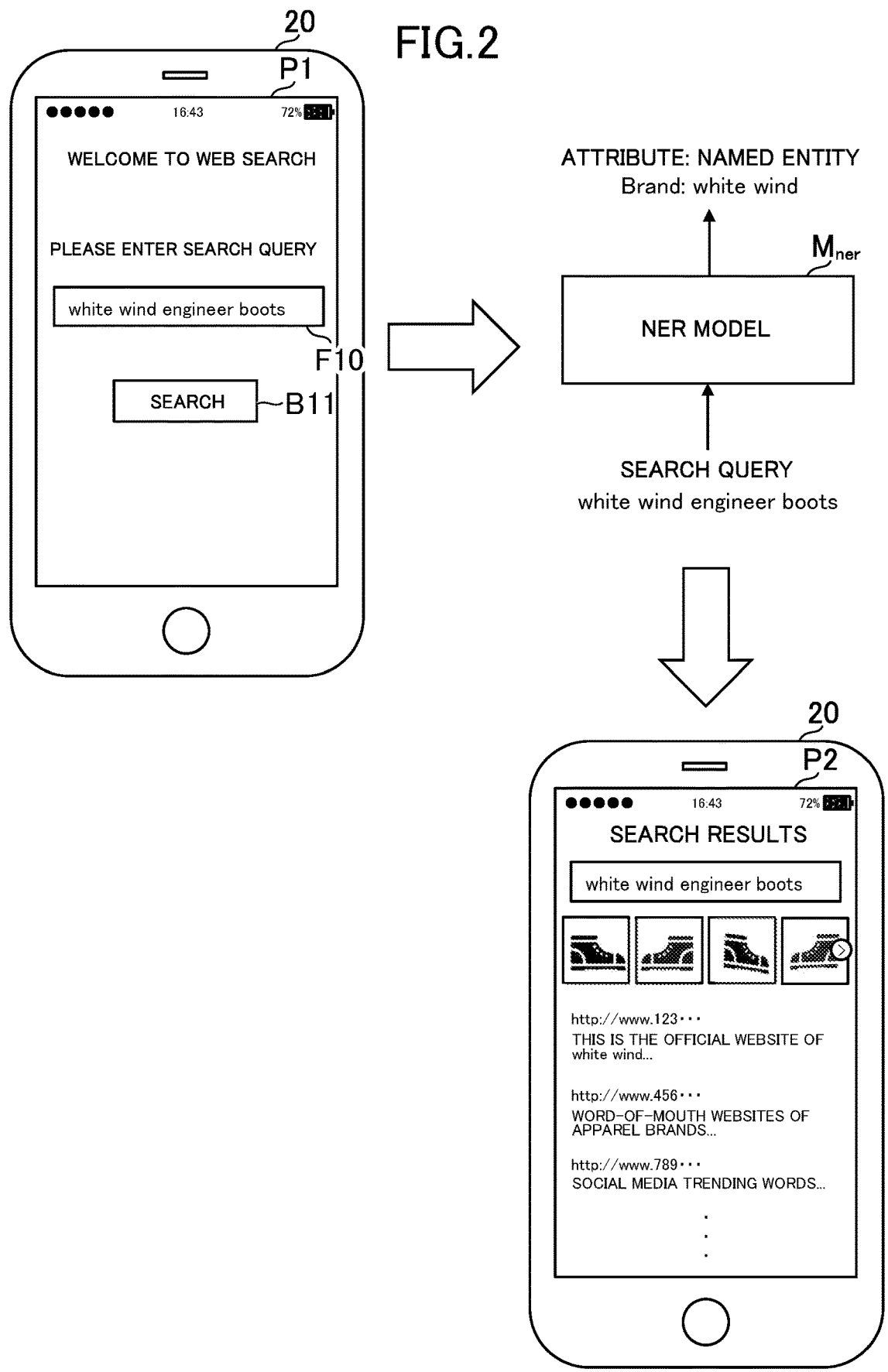
FIG. 2 is a diagram for illustrating an example of how a user uses a search service.

FIG. 2 is a diagram for illustrating an example of how the user uses the search service. For example, when the user accesses the search server 10, a top page P1 of the search service is displayed on the display unit 25. The user inputs a search query into an input form F10 on the top page P1. The user can input any character string as the search query. The user can also include, in the search query, a space for separating words.

For example, when the user selects a button B11, the search server 10 executes a web page search based on the search query input by the user. For the search itself, various publicly known search engines can be used. The search server 10 acquires a plurality of web pages that have hit the search query as search results, and transmits the search results to the user terminal 20. When the user terminal 20 receives the search results from the search server 10, a search result page P2 is displayed on the display unit 25. In the at least one embodiment, an English search query is taken as an example, but the data augmentation system 1 can support any other language such as Japanese or Chinese.

In the example of FIG. 2, a search query "white wind engineer boots" is input. It is assumed that the "white wind" is a name of an apparel brand that exists only in a world in the at least one embodiment. The "engineer boots" are a type of shoe. It is considered that the user has input the search query of FIG. 2 with an intention of searching for web pages of the "engineer boots" offered for sale by the "white wind" company.

However, words included in search queries have various meanings. Thus, even when the search server 10 executes a search through use of only a character string included in a search query, there is a possibility that the search result page P2 unintended by the user may be displayed. For example, the word "white" is a name of a color as well. Assuming that there exists another apparel brand called "engineer," the word "engineer" is also a name of the other apparel brand. There is a possibility that web pages unintended by the user may be retrieved depending on the meanings of those words.

In view of this, the search server 10 uses a named entity recognition (NER) model $M_{ner}$ using a machine learning method to recognize a named entity included in a search query and an attribute of the named entity. The named entity itself may be any one of various representations to be recognized in the named entity recognition task (named entity extraction task). For example, the named entity is a representation such as a proper noun, a color, a size, a material, a date, a quantity, or an amount of money.

The attributes are classifications of named entities. Depending on the type of named entity, the attribute may also be called "category" or "genre." For example, the attribute may be any information such as "Brand," "Color," "Size," or "Material" that can classify the named entity from some point of view. The named entity has at least one attribute. The named entity can also be said to be an attribute value being a specific value of the attribute.

As the machine learning method itself used by the NER model $M_{ner}$, any one of various methods used for the named entity recognition task can be used. For example, the machine learning method may be any one of supervised learning, semi-supervised learning, or unsupervised learning. For example, the NER model $M_{ner}$ may be a model using a neural network, BERT, CharacterBERT, a transformer, or another method.

Other examples of the method may include a sparse linear one-versus-reset (OVR) model (for example, DiSMEC, ProXML, or PPDSparse), a partitioning model (for example, eXtreme-Text, Bonsai, napkinXC, or Parabel), an embedding model (also called "graph-based model"; for example, SLICE or AnnexML), and a transformer-based model (for example, XR-Transformer or LightXML).

For example, the search server 10 inputs a search query to the NER model $M_{ner}$. The NER model $M_{ner}$ computes, based on the input search query, a feature amount (for example, multidimensional vector representing an embedded representation) of the search query. The NER model $M_{ner}$ outputs a named entity included in the search query and the attributes of the named entity based on the computed feature amount. As the series of processing steps itself, publicly known processing of the NER model $M_{ner}$ can be used.

In the example of FIG. 2, the named entity "white wind" and the attribute "Brand" of the named entity are recognized from the search query. When web pages to be searched are associated with pairs of a named entity and an attribute that serve as indices, web pages that match the pair of the named entity and the attribute that have been recognized from the search query are retrieved, to thereby be able to display search results intended by the user on the search result page P2.

Supposing that the "white" in the search query is recognized as a named entity and the attribute "color" is recognized for the named entity "white," there is a possibility that white-colored shoes that are irrelevant to the "white wind" company may be displayed on the search result page P2. In this respect, the NER model $M_{ner}$ can avoid such recognition and recognize the named entity "white wind" and the attribute "Brand" of the named entity based on a sequence of words in the search query.

For example, the NER model $M_{ner}$ learns training data including pairs of a search query for training and a named entity and attribute that serve as a ground truth. When an attempt is made to improve accuracy of the NER model $M_{ner}$, it is required to prepare a large amount of training data, thereby extremely consuming time and labor. In view of this, the data augmentation system 1 achieves the data augmentation by generating new training data based on the training data prepared in advance.

In the at least one embodiment, a case in which a variational auto-encoder (VAE) is used to achieve the data augmentation is taken as an example. The VAE is a method that merges an expectation-maximization (EM) algorithm, which is one of methods of estimating maximum likelihood of parameters of a stochastic model, and variational Bayes, which is one of solutions for models involving latent variables. As the VAE itself, various methods can be employed, and examples thereof include a method proposed by Kingma et al. (Auto-Encoding Variational Bayes, https://arxiv.org/abs/1312.6114) and other methods derived from the proposed method.

Further, in the at least one embodiment, the VAE based on a long short-term memory (LSTM) is described as an example of the VAE. The LSTM is a type of neural network that can learn long-term dependencies. For example, the LSTM includes a memory cell, an input gate, an output gate, and a forget gate. The memory cell is a cell that stores a value for a certain period. The input gate, the output gate, and the forget gate control information input to the memory cell and information output from the memory cell. A model for the data augmentation using the VAE is hereinafter referred to as "VAE model."

Figure 3:
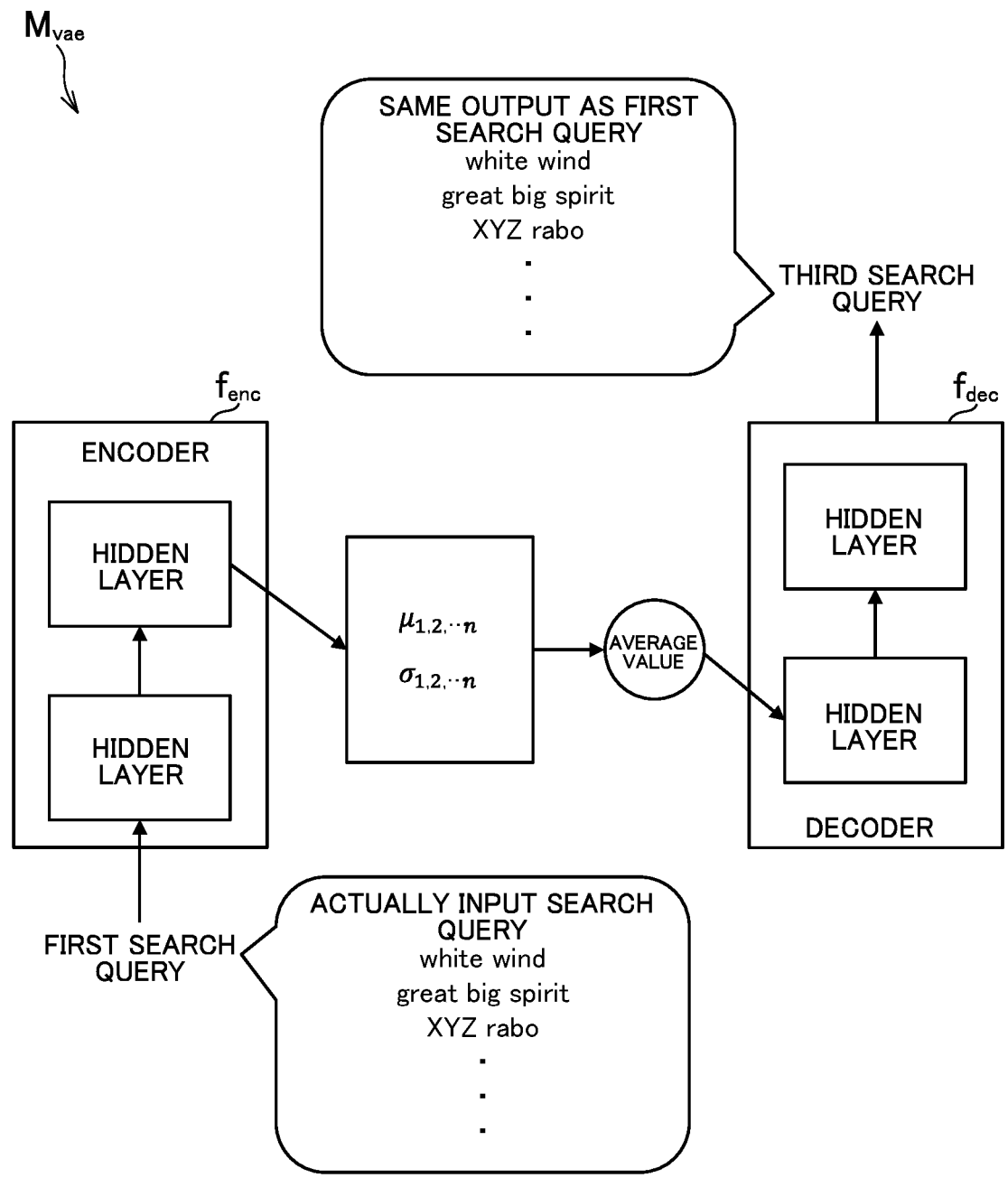
FIG. 3 is a diagram for illustrating an example of a learning phase of a VAE model.

FIG. 3 is a diagram for illustrating an example of a learning phase of the VAE model. In the at least one embodiment, a VAE model $M_{vae}$ using a BiLSTM is taken as an example. For example, the VAE model $M_{vae}$ includes an encoder $f_{enc}$ and a decoder $f_{dec}$. For example, the encoder $f_{enc}$ and the decoder $f_{dec}$ each include at least one hidden layer. In the example of FIG. 3, the encoder $f_{enc}$ and the decoder $f_{dec}$ each include two hidden layers, but the number of hidden layers may be one or three or more. The hidden layer may have any size, and the size, for example, may be 1,024 or may be larger or smaller than 1,024.

In the following description, when it is required to distinguish search queries, the search queries are distinguished by names of first to fifth search queries as follows. Unless otherwise particularly specified, the first search query to the fifth search query are referred to simply as "search queries." In addition, named entities and attributes that are included in the first search query to the fifth search query are referred to as "first named entity" to "fifth named entity" and "first attribute" to "fifth attribute," respectively. Unless otherwise particularly specified, the first named entity to the fifth named entity are referred to simply as "named entities." Unless otherwise particularly specified, the first attribute to the fifth attribute are referred to simply as "attributes."

First search query: A search query that is input to the VAE model $M_{vae}$ during training of the VAE model $M_{vae}$.

Second search query: A search query that is output from the trained VAE model $M_{vae}$.

Third search query: A search query that is output from the VAE model $M_{vae}$ during the training of the VAE model $M_{vae}$. In the at least one embodiment, the third search query is the same as the first search query.

Fourth search query: A search query that was actually input in the search service before training of the NER model $M_{ner}$ and the training of the VAE model $M_{vae}$ are executed. In the at least one embodiment, the fourth search query may be the first search query.

Fifth search query: A search query that is input to the trained NER model $M_{ner}$. The fifth search query may become the first search query in a future.

The encoder $f_{enc}$ learns mapping from the first search query input during the training to an array of a cell state of the LSTM assumed to be a normal distribution. In FIG. 3, a part of each first search query other than the first named entity is omitted, but the other part may also be input to the encoder $f_{enc}$, or each first search query may be input to the encoder $f_{enc}$ after having the other part removed. That is, only the first named entity in the first search query may be input to the encoder $f_{enc}$.

For example, when the first search query is input to the VAE model $M_{vae}$, the embedded representation of the first search query is computed. The embedded representation of the first search query is input to the encoder $f_{enc}$. The encoder $f_{enc}$ learns the mapping from the input embedded representations to the arrays (in FIG. 3, box enclosing characters of parameters μ and σ, where "n" represents any natural number indicating the number of arrays). At that time, replacement called "reparameterization tricks" may be performed to ensure diversity across the VAE model $M_{vae}$. For details of the replacement, see the above-mentioned research paper by Kingma et al.

The decoder $f_{dec}$ learns the mapping from an average value of the cell state in the array to the third search query output during training. For example, the decoder $f_{dec}$ acquires the cell state in the array in order to compute the embedded representation of the third search query being final output. In the at least one embodiment, a case in which the third search query is the same as the first search query is described. Thus, the decoder $f_{dec}$ learns the mapping from the average value to the third search query so that the embedded representation computed from the average value of the cell state in the array becomes closer to the embedded representation of the first search query being the same as the third search query.

As methods themselves of executing the learning by the encoder $f_{enc}$ and the learning by the decoder $f_{dec}$, various methods used for the VAE can be used. The number of arrays of parameters μ and σ may also be freely set. In the at least one embodiment, a distribution N(μ, σ) of the parameters μ and σ conforms to a normal distribution N(0, 1), but the distribution N(μ, σ) may conform to a distribution other than the normal distribution N(0, 1). When the training of the VAE model $M_{vae}$ is repeated to complete the learning phase, creation of the trained VAE model $M_{vae}$ is completed, and the process shifts to a generalization phase. In the generalization phase, the trained VAE model $M_{vae}$ is used to generate a second search query.

Figure 4:
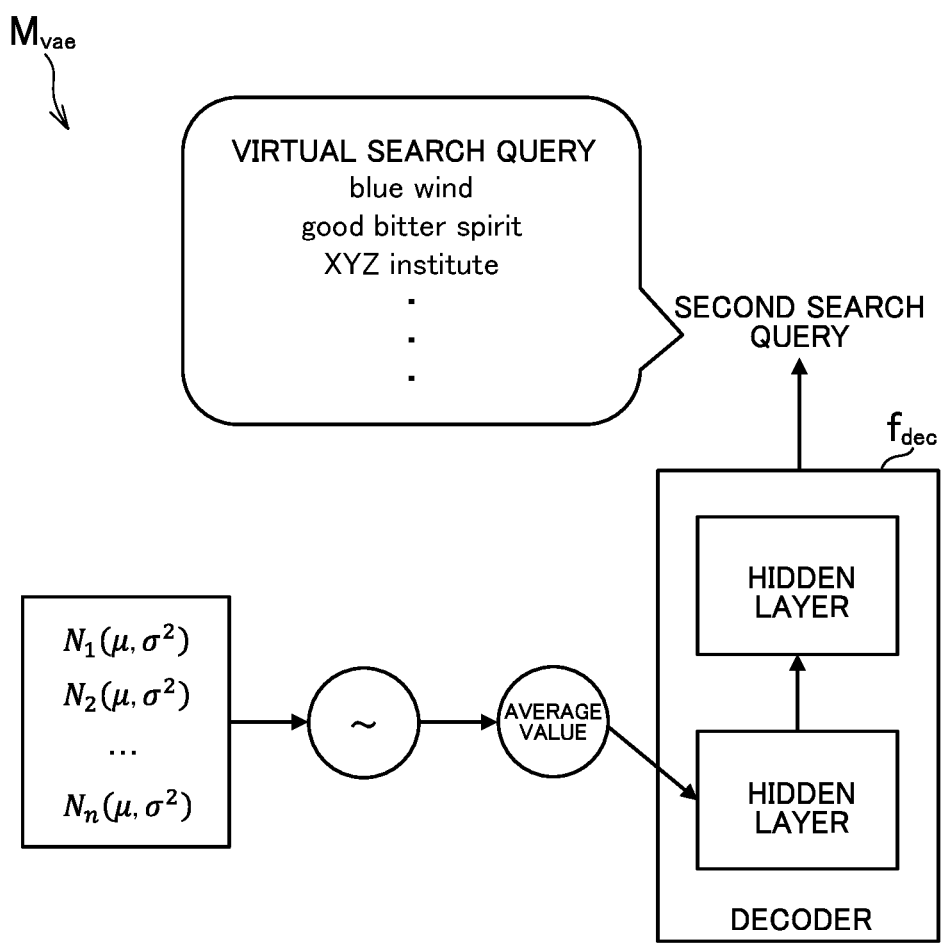
FIG. 4 is a diagram for illustrating an example of a generalization phase of the trained VAE model.

FIG. 4 is a diagram for illustrating an example of the generalization phase of the trained VAE model $M_{vae}$. In the generalization phase in the at least one embodiment, the encoder $f_{enc}$ is not involved, and hence the encoder $f_{enc}$ is omitted in FIG. 4. The VAE model $M_{vae}$ uses the decoder $f_{dec}$ to generate a second search query by setting the average value in the arrays (in FIG. 4, box enclosing distributions $N_1(μ, v^2)$ to $N_n(μ, σ^2)$) sampled from the normal distribution as an initial cell state. For example, the average value is computed based on a random number. That is, each time a processing step of generating a second search query is executed, an internally computed average value becomes a different value. Thus, the second search query output from the trained VAE model $M_{vae}$ varies stochastically or randomly.

For example, the second search query is obtained by replacing a part of the first search query by other characters.

Which character in the first search query is to be replaced by which character is changed stochastically or randomly depending on processing of the decoder $f_{dec}$. The replaced characters and replacing characters may have embedded representations that are close to each other on a vector space (characters may be replaced by characters that are semantically similar thereto), or may have embedded representations that are not close to each other (characters may be replaced by characters that are not semantically similar thereto). The second search query may be formed of only the second named entity, or may include the second named entity and another representation.

Further, some characters of words in the first search query may be replaced by other characters to generate a second search query including a fictitious word that does not exist in reality. For example, "h" and "t" of the word "white" in the first search query may be replaced by "k" and "j", respectively, to generate a second search query including a fictitious word "wkije," which does not exist in reality. Coined words are sometimes used as proper nouns such as the names of apparel brands, and hence even such a fictitious word may be useful for the data augmentation.

In the at least one embodiment, in principle, the second search query is not the first search query actually input in a past search but a virtual search query that does not actually exist. For example, the second search query includes a named entity such as a virtual apparel brand, a virtual color, a virtual size, or a virtual material. However, the second search query may happen to be the same as the search query input in a past search. The second search query may also happen to be a search query that actually exists.

In the example of FIG. 4, a second search query "blue wind" similar to the embedded representation of the first search query "white wind" is output from the VAE model $M_{vae}$. A second search query "good bitter spirit" similar to the embedded representation of the first search query "great big spirit" is output from the VAE model $M_{vae}$. A second search query "XYZ institute" similar to the embedded representation of the first search query "XYZ ratio" is output from the VAE model $M_{vae}$. It is assumed that those second search queries are fictitious apparel brands that do not actually exist.

In FIG. 4, the fictitious apparel brands are illustrated as examples of the second search query, but when other first named entities different from the apparel brands are included in the first search queries, the VAE model $M_{vae}$ can generate second search queries including second named entities similar to the other first named entities. For example, when the VAE model $M_{vae}$ has learned the first search queries including home appliance manufacturers, restaurants, personal names, or place names, the VAE model $M_{vae}$ generates second search queries indicating fictitious home appliance manufacturers, restaurants, personal names, or place name. For example, when the VAE model $M_{vae}$ has learned the first search queries including names of colors, sizes, or materials, the VAE model $M_{vae}$ generates second search queries indicating fictitious colors, sizes, or materials.

For example, the VAE model $M_{vae}$ continuously outputs the second search queries having mutually different details. The VAE model $M_{vae}$ can continuously output new second search queries based on the parameters μ and σ in the array without involving the encoder $f_{enc}$. The second search query is stochastically or randomly output, and hence the details of a certain second search query A and the details of another second search query B are subtly different. For example, the second search query A and the second search query B are partially or entirely different. However, the second search queries output from the VAE model $M_{vae}$ may happen to include queries that are the same as each other.

In the at least one embodiment, training data for the NER model $M_{ner}$ is generated based on the second search queries output by the VAE model $M_{vae}$. For example, the second search queries are input to the NER model $M_{ner}$ that has temporarily been created through use of a small amount of training data, and the second named entities and the second attributes are estimated. The NER model $M_{ner}$ does not have so high accuracy, but it is assumed that the second named entities and the second attributes of the second search queries similar to the first search queries learned by the NER model $M_{ner}$ can be estimated with a certain degree of accuracy.

For example, the data augmentation is executed by generating pairs of a second search query and a second named entity and second attribute as new training data for the NER model $M_{ner}$. Additional training of the NER model $M_{ner}$ that has temporarily been created is executed based on the new training data. This can save the time and labor to prepare the training data for the NER model $M_{ner}$. Now, details of the at least one embodiment are described.

3. Functions Implemented by Data Augmentation System

Figure 5:
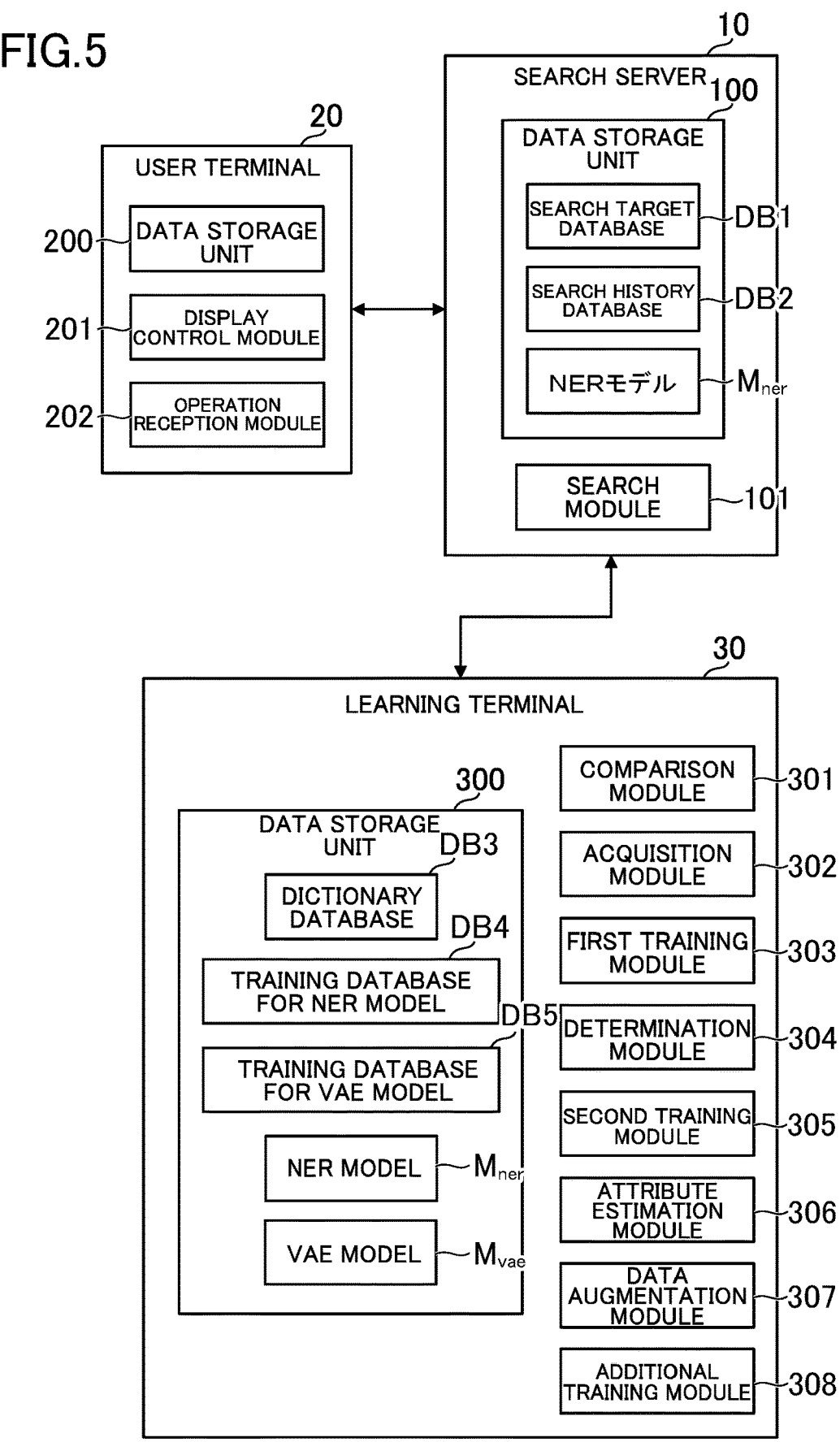
FIG. 5 is a diagram for illustrating an example of functions implemented by the data augmentation system.

FIG. 5 is a diagram for illustrating an example of functions implemented by the data augmentation system 1.

[3-1. Functions implemented by Search Server]

The search server 10 includes a data storage unit 100 and a search module 101. The data storage unit 100 is implemented by the storage unit 12. The search module 101 is implemented by control unit 11.

[Data Storage Unit]

The data storage unit 100 stores data required for executing searches. For example, the data storage unit 100 stores a search target database DB1 and a search history database DB2.

FIG. 6 is a table for showing an example of the search target database DB1. The search target database DB1 is a database that stores data relating to search targets. In the at least one embodiment, a web page corresponds to the search target. Thus, the web page as used herein can be read as "search target." The search target is not limited to the web page as long as the search target is a subject for a search. For example, as in Modification Example 3, a product may correspond to the search target. In addition, for example, content such as a moving image or music may correspond to the search target.

For example, the search target database DB1 stores URLs of web pages and indices of the web pages. In the at least one embodiment, the search target database DB1 stores, as the indices, an attribute of a web page and a named entity included in the web page. The attribute is hereinafter referred to as "web page attribute." The named entity is hereinafter referred to as "web page named entity."

In the at least one embodiment, a case in which a creator of a web page designates the web page attribute and the web page named entity to be used as the indices is described. The web page attribute and the web page named entity may be automatically extracted from within the web page through use of a dictionary matching or machine learning method. The search target database DB1 may store another index such as a keyword extracted from the web page.

FIG. 7 is a table for showing an example of the search history database DB2. The search history database DB2 is a database that stores data relating to searches executed in the past. For example, the search history database DB2 stores the fourth search query actually input by the user, the URL of a web page selected from the search result page P2, and a search date and time. The search date and time are a date and time at which the search was executed. The search history database DB2 may store search data for the entire past period, or may store search data for a part of the period.

For example, the data storage unit 100 stores the trained NER model $M_{ner}$. The NER model $M_{ner}$ includes a parameter portion to be adjusted through training and a program portion in which procedures for internal processing such as computation of embedded representations are defined, and hence the data storage unit 100 stores data of the parameter portion of the NER model $M_{ner}$ and data of the program portion of the NER model $M_{ner}$. Those pieces of data may be combined into one piece of data.

In the at least one embodiment, the training of the NER model $M_{ner}$ is executed by the learning terminal 30, and hence the search server 10 receives the trained NER model $M_{ner}$ from the learning terminal 30, and records the received trained NER model $M_{ner}$ in the data storage unit 100. The training of the NER model $M_{ner}$ may be executed by the search server 10. In this case, the search server 10 has the same functions as those of the learning terminal 30.

[Search Module]

The search module 101 executes a search. In this case, a search that is executed after the trained NER model $M_{ner}$ has been created is described, but before the trained NER model $M_{ner}$ is created, the search module 101 executes a search based on the fourth search query input by the user, and updates the search history database DB2. In this case, no trained NER model $M_{ner}$ has been created, and hence the web page attribute and the web page named entity are not used for the search.

After the trained NER model $M_{ner}$ has been created, for example, the search module 101 executes a search based on the fifth search query input by the user. For example, the search module 101 receives the fifth search query input by the user from the user terminal 20. The search module 101 executes a search based on the received fifth search query and the indices stored in the search target database DB1. The search module 101 generates display data (for example, HTML data) of the search result page P2 based on execution results of the search, and transmits the display data to the user terminal 20.

In the at least one embodiment, the search module 101 uses the web page attribute and the web page named entity as the indices, and hence the search module 101 inputs the fifth search query input by the user to the trained NER model $M_{ner}$. The NER model $M_{ner}$ computes the feature amount of the input fifth search query, and outputs the fifth attribute and the fifth named entity corresponding to the computed feature amount.

The search module 101 executes a search based on the fifth attribute and the fifth named entity that have been output from the NER model $M_{ner}$ and the web page attribute and the web page named entity that are stored in the search target database DB1. In the search, another factor such as a keyword may also be taken into consideration. In this case, it is assumed that a web page associated with the web page attribute and the web page named entity that are the same as the fifth attribute and the fifth named entity that have been output from the NER model $M_{ner}$ is searched for, but it suffices that the search itself is executed through use of a publicly known search engine.

After the search module 101 has executed the search, the search module 101 stores the fifth search query input by the user in the search history database DB2 as the fourth search query. The search module 101 stores the current date and time as the search date and time in the search history database DB2. When the user selects a web page included in the search result page P2, the search module 101 stores the URL of the selected web page in the search history database DB2.

[3-2. Functions implemented by User Terminal]

The user terminal 20 includes a data storage unit 200, a display control module 201, and an operation reception module 202. The data storage unit 200 is implemented by the storage unit 22. The display control module 201 and the operation reception module 202 are implemented by the control unit 21.

[Data Storage Unit]

The data storage unit 200 stores data required for executing searches. For example, the data storage unit 200 stores a browser required for displaying each of the top page P1 and the search result page P2. For example, the data storage unit 200 may store an application dedicated to the search service in place of the browser.

[Display Control Module]

The display control module 201 displays various screens on the display unit 25. For example, the display control module 201 displays each of the top page P1 and the search result page P2 on the display unit 25 based on the display data received from the search server 10.

[Operation Receiving Module]

The operation reception module 202 receives various operations. For example, the operation reception module 202 receives operations on each of the top page P1 and the search result page P2.

[3-3. Functions implemented by Learning Terminal]

The learning terminal 30 includes the data storage unit 300, a comparison module 301, an acquisition module 302, a first training module 303, a determination module 304, a second training module 305, an attribute estimation module 306, a data augmentation module 307, and an additional training module 308. The data storage unit 300 is implemented by the storage unit 32. The comparison module 301, the acquisition module 302, the first training module 303, the determination module 304, the second training module 305, the attribute estimation module 306, the data augmentation module 307, and the additional training module 308 are implemented by the control unit 31.

[Data Storage Unit]

The data storage unit 300 stores data required for the data augmentation. For example, the data storage unit 300 stores a dictionary database DB3, a training database DB4 for the NER model $M_{ner}$, and a training database DB5 for the VAE model $M_{vae}$.

FIG. 8 is a table for showing an example of the dictionary database DB3. The dictionary database DB3 is a database relating to the first named entity. For example, the dictionary database DB3 stores a large number of pairs of a first attribute and a first named entity. For example, all or some of the web page attributes and the web page named entities that are stored in the search target database DB1 may be acquired and stored in the dictionary database DB3 as the first attributes and the first named entities.

The dictionary database DB3 may store the first attributes and the first named entities that have been input by a creator who creates the NER model $M_{ner}$ and the VAE model $M_{vae}$. In addition, for example, the dictionary database DB3 may store attributes and named entities that have been acquired from another service (for example, Internet encyclopedia service) different from the search service as the first attributes and the first named entities.

FIG. 9 is a table for showing an example of the training database DB4 for the NER model $M_{ner}$. The training database DB4 for the NER model $M_{ner}$ is a database that stores the training data for the NER model $M_{ner}$. For example, the training data includes pairs of a first search query actually input in a past search and a first named entity and first attribute. For example, the training data for the NER model $M_{ner}$ is manually prepared by the creator who creates the NER model $M_{ner}$ and the VAE model $M_{vae}$.

Some tool that automatically generates training data for the NER model $M_{ner}$ may be used. When the tool is used, it is assumed that there is a limit on the number of pieces of training data that can be generated for the NER model $M_{ner}$. Thus, it is assumed that it is required to use the method in the at least one embodiment to augment the training data through the data augmentation for the NER model $M_{ner}$.

FIG. 10 is a table for showing an example of the training database DB5 for the VAE model $M_{vae}$. The training database DB5 for the VAE model $M_{vae}$ is a database that stores the training data for the VAE model $M_{vae}$. For example, the training data for the VAE model $M_{vae}$ includes the first search queries that were actually input in past searches. In the example of FIG. 10, it is assumed that the training data for the VAE model $M_{vae}$ includes the first search queries and the third search queries that are the same as the first search queries, but the third search queries are the same as the first search queries, and hence the training data for the VAE model $M_{vae}$ may include only the first search queries.

In FIG. 10, only the first named entities included in the first search queries are shown in the same manner as in FIG. 3, but the training data for the VAE model $M_{vae}$ may include parts of the first search queries other than the first named entities. It suffices that the training data for the VAE model $M_{vae}$ includes at least the first named entity in each first search query. The training data for the VAE model $M_{vae}$ may be manually prepared by the creator who creates the NER model $M_{ner}$ and the VAE model $M_{vae}$, or some tool that automatically generates training data for the VAE model $M_{vae}$ may be used.

For example, the data storage unit 300 stores a pre-trained NER model $M_{ner}$. The pre-trained NER model $M_{ner}$ is an NER model $M_{ner}$ with parameters having initial values. When the training is executed by the second training module 305 described later, the pre-trained NER model $M_{ner}$ has the parameters updated. When the parameters are updated, the data storage unit 300 stores the trained NER model $M_{ner}$. In addition, when the training is executed by the additional training module 308 described later, the parameters are further updated. When the parameters are further updated, the data storage unit 300 stores the final trained NER model $M_{ner}$.

For example, the data storage unit 300 stores a pre-trained VAE model $M_{vae}$. The pre-trained VAE model $M_{vae}$ is a VAE model $M_{vae}$ with parameters having initial values. In the at least one embodiment, the parameters μ and σ correspond to those parameters. The pre-trained VAE model $M_{vae}$ may include another parameter. Each parameter of the VAE model $M_{vae}$ is not fixed at one certain value but stochastically changes. Thus, which value is to be used varies stochastically depending on when the VAE model $M_{vae}$ executes the processing.

The VAE model $M_{vae}$ includes a parameter portion to be adjusted through training and a program portion in which procedures for internal processing such as computation of embedded representations are defined, and hence the data storage unit 100 stores data of the parameter portion of the VAE model $M_{vae}$ and data of the program portion of the VAE model $M_{vae}$. Those pieces of data may be combined into one piece of data. When the training is executed by the first training module 303 described later, the pre-trained VAE model $M_{vae}$ has the parameters updated. When the parameters are updated, the data storage unit 300 stores the trained VAE model $M_{vae}$.

[Comparison Module]

The comparison module 301 compares each of a plurality of fourth search queries actually input in searches to the dictionary database DB3. In the at least one embodiment, the plurality of fourth search queries are stored in the search history database DB2. Thus, the comparison module 301 acquires the plurality of fourth search queries from the search history database DB2. The fourth search queries may be stored in another database different from the search history database DB2.

For example, the comparison module 301 acquires, from the search server 10, each of the plurality of fourth search queries stored in the search history database DB2. For each fourth search query, the comparison module 301 determines whether or not the fourth search query includes any one of the first named entities stored in the dictionary database DB3. In the at least one embodiment, a case in which the determination requires a perfect match between the first named entity and the character string included in the fourth search query is described, but a partial match may be permitted.

[Acquisition Module]

The acquisition module 302 acquires the first search query including the first named entity that was actually input in a search executed in the past. The first search query may include a plurality of first named entities. In the at least one embodiment, the acquisition module 302 acquires the fourth search query that matches the dictionary database DB3 as the first search query. Matching as used herein refers to including the first named entity stored in the dictionary database DB3.

For example, the acquisition module 302 stores the fourth search query that matches the dictionary database DB3 as the first search query in the training database DB5 for the VAE model $M_{vae}$. The acquisition module 302 may store the first search query as it is in the training database DB5 for the VAE model $M_{vae}$, or may store only the first named entity in the first search query in the training database DB5 for the VAE model $M_{vae}$. In the at least one embodiment, the acquisition module 302 also stores the third search query being the same as the first search query in the training database DB5 for the VAE model $M_{vae}$.

In the at least one embodiment, there is a possibility that the search target database DB1 stores at least one of a fourth search query that does not include any named entity or a fourth search query that includes another named entity different from the first named entity. Thus, the acquisition module 302 narrows down all the fourth search queries into fourth search queries suitable as the first search query based on comparison results obtained by the comparison module 301. The acquisition module 302 can acquire the first search query stored in the training database DB5 for the VAE model $M_{vae}$ at any timing.

The first search queries may be manually narrowed down by the creator of the VAE model $M_{vae}$ instead of based on the comparison results obtained by the comparison module 301. In this case, the comparison module 301 is not included in the learning terminal 30. The acquisition module 302 acquires the first search query created by the creator. For example, the acquisition module 302 may acquire the first search query input from the operating unit 34. In this case, the creator may also designate a first named entity portion in the first search query and the first attribute. The acquisition module 302 may acquire the first named entity portion and the first attribute that have been designated by the creator.

[First Training Module]

The first training module 303 executes the training of the VAE model $M_{vae}$ that outputs the second search query including a virtual second named entity, which is different from the first named entity, based on the first search query. The VAE model $M_{vae}$ is an example of the first model. Thus, the VAE model $M_{vae}$ as used herein can be read as "first model." The first model is only required to be a model capable of outputting the second search query when the first search query is input, and may be another model different from the VAE model $M_{vae}$.

For example, the first model may be a model using a generative adversarial network (GAN). The GAN includes a generator that generates new data from data that actually exists and a discriminator that evaluates the generated data. The generator and the discriminator that are included in the GAN can generate data that does not actually exist in conformity to features of the data that actually exists. The first search query is input to the first model using the GAN as the data that actually exists. The GAN generates a second search query in conformity to the first search query.

For example, the first model may also be an unsupervised learning model using another method different from the VAE and the GAN. The other method may be a model used in principal component analysis or association analysis. The first model may also be a supervised learning model or a semi-supervised learning model. For example, the first model may also be a Bayesian neural network with parameters having stochastic variables.

The first model can use any machine learning method. The machine learning method for the first model may be the method exemplified in the description of the NER model $M_{ner}$. For example, the first model may be a model that outputs a second search query when a first search query and data corresponding to noise generated at random are input. The above-mentioned GAN is one kind of such a first model. The data input together with the first search query is not required to be the noise generated at random.

In the at least one embodiment, during the training of the VAE model $M_{vae}$, in principle, the training is executed so that input and output become the same. Thus, a training module executes the training so that, when the first search query is input to the first model, the third search query that is the same as the first search query is output from the first model. The learning method is as described with reference to FIG. 3. The training module executes the training involving the learning of the mapping by the encoder $f_{enc}$ and the learning of the mapping by the decoder $f_{dec}$.

During the training of the VAE model $M_{vae}$, the input and the output may differ from each other. That is, the third search query may differ from the first search query. However, when the third search query significantly differs from the first search query, the learning of the mapping may not be performed accurately, and hence it is assumed that the third search query has details similar to those of the first search query. For example, the third search query has details partially modified from those of the first search query.

In the at least one embodiment, the first search query includes a plurality of characters. Each of the plurality of characters is associated with a tag relating to the first named entity. The tag is information for classifying each individual character in the first named entity. In the at least one embodiment, a case in which a begin-inside-outside (BIO) tag is used is described, but the tag may be a begin-inside-outside-end-single (BIOES) tag, or may be a tag defined from another point of view.

Figure 11:
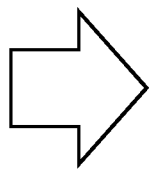
FIG. 11 is a diagram for illustrating an example of tags associated with individual characters included in a first search query.

FIG. 11 is a diagram for illustrating an example of tags associated with individual characters included in the first search query. The BIO tag is a tag for classifying which part of the first named entity each individual character forms. A tag "B" means a start position of the first named entity. A tag "I" means a character included in the first named entity not at the start position but at an intermediate position. A tag "O" means a character outside the first named entity.

It is assumed that each individual character in the first search query is associated with any one of the tag "B", the tag "I", or the tag "O", which is omitted in the training database DB5 for the VAE model $M_{vae}$ of FIG. 10. The BIO tag may be manually designated by the creator of the VAE model $M_{vae}$, or may be automatically given by comparing the first named entity stored in the dictionary database DB3 and each individual character included in the first search query.

In the example of FIG. 11, the first search query "white wind" includes two words, namely, the word "white" and the word "wind." The "white wind" is also the first named entity. The word "white" is located at the start position of the first named entity, and is thus associated with the tag "B". The word "wind" is located at an intermediate position being a position after the start position of the first named entity, and is thus associated with the tag "I". When the part "engineer boots" is also used for training, each word in this part is associated with the tag "O", which is omitted in FIG. 11.

As in FIG. 11, the first search query "white wind" is divided in units of characters. The first character "w" is associated with the tag "B". The second and subsequent characters "h" to "d" are associated with the tag "I". In the at least one embodiment, there are also attribute tags, and hence in the example of FIG. 11, a tag "BRAND" is also associated. For other attributes, it is assumed that there are also attribute tags such as "COLOR," "SIZE," and "MATERIAL." In the first search query, a symbol that means a tag (in FIG. 11, symbols "<", ">", and "–") and a character string that indicates the tag are inserted.

In the at least one embodiment, the first training module 303 executes the training based on the tags respectively associated with the plurality of characters. The first training module 303 can easily generate a virtual second search query in a specific language by executing the training with each character being tagged. For example, through the tagging in units of characters, the training is executed so that a second search query obtained by modifying only a part (for example, about one to three characters) of the first named entity instead of changing all the first named entity is generated.

As in FIG. 11, the first search query may be associated with the first attribute relating to the first named entity. For example, when the first search query is stored in the search target database DB1 as the fourth search query, the web page attribute associated with the fourth search query may be used as the first attribute, or the first attribute may be manually designated by the creator of the VAE model $M_{vae}$. In addition, for example, the first attribute is stored in the dictionary database DB3 together with the first named entity, and the first attribute associated with the first named entity included in the first search query may be associated with the first search query.

For example, the first training module 303 may execute the training based on the first search query and the first attribute. Through the training using the first attribute, the first training module 303 enables the VAE model $M_{vae}$ to recognize that the first search queries associated with the same first attribute belong to the same group. Thus, the VAE model $M_{vae}$ can generate a second search query in which a certain first search query and another first search query recognized as belonging to the same group are mixed, thereby being able to generate a second search query that appears realistic.

[Determination Module]

The determination module 304 determines whether or not a predetermined condition is satisfied based on the second search query. The predetermined condition is a condition being a criterion for determining whether or not the second search query is to be used for the data augmentation. Any condition relating to the second search query can be set as the predetermined condition. In the at least one embodiment, the following first to third conditions are described as examples of the predetermined condition.

(First condition) For example, the determination module 304 may determine whether or not the predetermined condition is satisfied by determining whether or not the second named entity included in the second search query has a predetermined number of characters or more. The number of characters is hereinafter referred to as "number of characters of a first condition." In the at least one embodiment, three characters are described as an example of the number of characters of the first condition, but the number of characters of the first condition may be any number of characters, and is not limited to three characters. For example, the number of characters of the first condition may be two characters or four or more characters.

For example, when the second search query includes only one second named entity, the determination module 304 determines whether or not the one second named entity has three or more characters. When the second search query includes a plurality of second named entities, the determination module 304 determines whether or not each of the plurality of second named entities has three or more characters. When the second search query includes some other character string different from the second named entity, the determination module 304 does not handle the other character string in the second search query as a determination target, and determines whether or not the second named entity has three or more characters.

(Second condition) For example, the determination module 304 may determine whether or not a predetermined condition corresponding to the types of characters in the second named entity included in the second search query is satisfied. In the at least one embodiment, three types of characters, namely, an alphabetical character, a numeric character, and another kind are taken as examples, but the type of character itself may be any type that exists in the world. For example, hiragana, katakana, or kanji used in Japanese may correspond to the type of character. In addition, for example, a lowercase character, an uppercase character, a full-width character, or a half-width character may correspond to the type of character.

In the at least one embodiment, a second condition and a third condition are described as examples of the predetermined condition corresponding to the types of characters. For example, the determination module 304 determines, as the second condition, whether or not the second named entity included in the second search query is formed of only numeric characters. The determination module 304 determines that the second condition is not satisfied when the second named entity included in the second search query has only numeric characters, and the determination module 304 determines that the second condition is satisfied when the second named entity included in the second search query includes characters other than numeric characters.

(Third condition) For example, the determination module 304 determines, as the third condition, whether or not the second named entity included in the second search query has a predetermined number of characters or more when the second named entity is formed of only alphabetical characters. The number of characters is hereinafter referred to as "number of characters of the third condition." In the at least one embodiment, a case in which the number of characters of the third condition is five characters is described, but the number of characters of the third condition may be any number, and may be two to four characters or six or more characters.

For example, when the second search query includes only one second named entity formed of only alphabetical characters, the determination module 304 determines whether or not the one second named entity has five or more characters. When the second search query includes a plurality of second named entities formed of only alphabetical characters, the determination module 304 determines whether or not each of the plurality of second named entities has five or more characters. When the second search query includes some other character string different from the second named entity formed of only alphabetical characters, the determination module 304 does not handle the other character string in the second search query as a determination target, and determines whether or not the second named entity has five or more characters.

Examples of the predetermined condition are not limited to the first to third conditions. For example, in order to exclude the second search query that is too long, the predetermined condition may be an upper limit on the number of characters such as ten or less characters. For example, in order to exclude the second search query in which characters having an unnaturally large number of types are mixed, the predetermined condition may be an upper limit on the number of types of characters included in the second search query.

[Second Training Module]

The second training module 305 executes the training of the NER model $M_{ner}$. The NER model $M_{ner}$ created by the second training module 305 is a model that has temporarily been created through use of a small amount of training data. The NER model $M_{ner}$ that has temporarily been created can recognize the fifth attribute relating to the fifth named entity with a certain degree of accuracy. In the at least one embodiment, the additional training module 308 described later executes additional training on the NER model $M_{ner}$ that has temporarily been created.

For example, when the second training module 305 receives input of the first search query included in the training data stored in the training database DB4 for the NER model $M_{ner}$, the second training module 305 executes the training of the NER model $M_{ner}$ so that the first named entity and the first attribute that are included in the training data are output. As a learning method itself of the NER model $M_{ner}$, it is possible to use a learning method used in the machine learning method used for the NER model $M_{ner}$.

[Attribute Estimation Module]

The attribute estimation module 306 estimates the second attribute relating to the second named entity based on the NER model $M_{ner}$ that has learned the training data. In the at least one embodiment, the training data for the NER model $M_{ner}$ includes the first search query and the first attribute relating to the first named entity, and hence the attribute estimation module 306 estimates the second attribute based on a second model that has learned the training data including the first search query and the first attribute.

For example, the attribute estimation module 306 inputs the second search query to the trained NER model $M_{ner}$ (NER model $M_{ner}$ that has temporarily been created, which has been described above). The trained NER model $M_{ner}$ computes the embedded representation of the second search query, and outputs the second named entity and the second attribute that correspond to the computed embedded representation. The attribute estimation module 306 acquires the second named entity and the second attribute that have been output from the trained NER model $M_{ner}$.

[Data Augmentation Module]

The data augmentation module 307 executes the data augmentation based on the second search query output by the trained VAE model $M_{vae}$. In the at least one embodiment, the data augmentation module 307 executes the data augmentation by recording the second search query in the data storage unit 100. The data augmentation module 307 may execute the data augmentation by recording the second search query in another computer different from the learning terminal 30 or in an external information storage medium.

In the at least one embodiment, the VAE model $M_{vae}$ is a model having the output determined stochastically or randomly, and hence the data augmentation module 307 executes the data augmentation based on the second search query stochastically or randomly output by the trained VAE model $M_{vae}$. The VAE model $M_{vae}$ has the output determined stochastically or randomly with a standard normal distribution followed by a probability density function to which a latent variable conforms, and hence the data augmentation module 307 executes the data augmentation based on the second search query stochastically or randomly output by the trained VAE model $M_{vae}$.

In the at least one embodiment, the determination module 304 determines whether or not the second search query is appropriate, and hence the data augmentation module 307 executes the data augmentation when it is determined that the predetermined condition is satisfied. The data augmentation module 307 avoids using, for the data augmentation, the second search query determined not to satisfy the predetermined condition, and executes the data augmentation based on the second search query determined to satisfy the predetermined condition.

In the at least one embodiment, the data augmentation module 307 executes the data augmentation by augmenting the training data for the NER model $M_{ner}$ based on the second search query. The NER model $M_{ner}$ is an example of the second model. Thus, the NER model $M_{ner}$ as used herein can be read as "second model." The second model is a model that recognizes the fifth named entity included in the fifth search query. When a search is executed based on the fifth search query, the fifth search query is stored in the search history database DB2 as a future first search query. When the NER model $M_{ner}$ is required to be newly created, the fifth search query is used as the first search query.

In the at least one embodiment, the data augmentation module 307 augments the training data based on the second search query and the second attribute estimated by the attribute estimation module 306. The data augmentation module 307 executes the data augmentation by generating new training data including pairs of the second search query and the second named entity and second attribute that are included in the second search query. A format of input and output of the training data is the same as in FIG. 9. For example, the data augmentation module 307 stores the new training data in the training database DB5 for the NER model $M_{ner}$. The data augmentation module 307 may add some word to the second search query output from the VAE model $M_{vae}$. The data augmentation module 307 may execute the data augmentation based on the second search query including some word.

The VAE model $M_{vae}$ may output not only the second search query but also the second attribute. For example, the VAE model $M_{vae}$ may output the second attribute "Brand" together with the second search query "blue wind." Through the training of the VAE model $M_{vae}$ with the first search query being tagged by the first attribute as in FIG. 11, the VAE model $M_{vae}$ becomes able to output the second attribute as well. In this case, the attribute estimation module 306 may be omitted. It suffices that the data augmentation module 307 stores the second search queries, the second named entities, and the second attributes, which have been output from the VAE model $M_{vae}$, in the training database DB5 for the NER model $M_{ner}$ as new training data.

[Additional Training Module]

The additional training module 308 executes the additional training of the trained NER model $M_{ner}$ based on the new training data output through the data augmentation. The additional training refers to additionally executing training on the NER model $M_{ner}$ that has been trained to some extent. The additional training module 308 executes the additional training of the NER model $M_{ner}$ that has been trained to some extent so that, when the second search query included in the new training data is input to the NER model $M_{ner}$, the second named entity and the second attribute that are included in the new training data are output. A method itself used in the additional training may be the same as the method used by the second training module 305.

4. Processing Executed by Data Augmentation System

FIG. 12 is a flow chart for illustrating an example of processing executed by the data augmentation system 1. This processing is executed by the control units 11, 21, and 31 by operating in accordance with a program stored in the storage unit 12, a program stored in the storage unit 22, and a program stored in the storage unit 32, respectively.

As in FIG. 12, the learning terminal 30 acquires a plurality of fourth search queries stored in the search history database DB2 from the search server 10 (Step S1). In Step S1, the learning terminal 30 transmits, to the search server 10, an acquisition request for acquiring all or part of the fourth search queries stored in the search history database DB2. When the search server 10 receives the acquisition request, the search server 10 transmits all or part of the fourth search queries stored in the search history database DB2 to the learning terminal 30.

The learning terminal 30 compares each of the plurality of fourth search queries acquired in Step S1 and the dictionary database DB3 to each other (Step S2). In Step S2, the learning terminal 30 determines whether or not the first named entity that is the same as the fourth named entity included in each of the plurality of fourth search queries is present in the dictionary database DB3. The learning terminal 30 acquires, as the first search query, each of the plurality of fourth search queries determined to be present in the dictionary database DB3 through the comparison of Step S2 (Step S3).

The learning terminal 30 stores the plurality of first search queries acquired in Step S3 in the training database DB4 for the NER model $M_{ner}$, and executes the training of the NER model $M_{ner}$ (Step S4). In Step S4, the learning terminal 30 adjusts the parameters of the NER model $M_{ner}$ so that, when the first search query included in the training data for the NER model $M_{ner}$ is input, the first named entity and the first attribute that are included in the training data are output.

The learning terminal 30 generates the training data for the VAE model $M_{vae}$ based on the plurality of first search queries acquired in Step S4 (Step S5). In Step S5, the learning terminal generates, for each first search query, a pair of the first search query and the third search query that is the same as the first search query as the training data for the VAE model $M_{vae}$. The learning terminal 30 stores, in the training database DB5 for the VAE model $M_{vae}$, the plurality of pieces of training data that have been generated.

The learning terminal 30 executes the training of the VAE model $M_{vae}$ based on the training data for the VAE model $M_{vae}$ generated in Step S5 (Step S6). In Step S6, the learning terminal 30 causes the encoder $f_{enc}$ to learn the mapping from the first search query included in the training data to the array of the cell state of the LSTM. The learning terminal 30 causes the decoder $f_{dec}$ to learn the mapping from the average value of the cell state in the array to the third search query included in the training data.

The learning terminal 30 acquires the second search query based on the VAE model $M_{vae}$ trained in Step S6 (Step S7). In Step S7, the learning terminal 30 does not use the encoder $f_{enc}$ of the trained VAE model $M_{vae}$, and sets the average value in the arrays sampled from the normal distribution as the initial cell state. The learning terminal 30 generates a second search query by the decoder $f_{dec}$ based on the initial cell state. The learning terminal 30 repeatedly generates a second search query. The trained VAE model $M_{vae}$ has the output determined stochastically or randomly, and hence, in principle, a different second search query is output each time.

The learning terminal 30 determines whether or not the second search queries acquired in Step S7 each satisfy a predetermined condition (Step S8). In Step S8, the learning terminal 30 determines whether or not each second search query satisfies each of the first to third conditions described above. The learning terminal 30 executes the data augmentation based on results of the determination of Step S8 (Step S9). In Step S9, the learning terminal 30 inputs the second search queries that satisfy the predetermined condition to the NER model $M_{ner}$ that has temporarily been created. The learning terminal 30 generates new training data for the NER model $M_{ner}$ from the second search queries and the second named entities and second attributes that have been output from the NER model $M_{ner}$.

The learning terminal 30 executes the additional training of the NER model $M_{ner}$ based on an execution result of the data augmentation of Step S9 (Step S10). In Step S10, the learning terminal 30 executes the training of the NER model $M_{ner}$ that has temporarily been created based on the new training data generated in Step S9. The learning terminal 30 transmits the trained NER model $M_{ner}$ the search server 10 (Step S11). The search server 10 receives the trained NER model $M_{ner}$ (Step S12). The search server 10 and the user terminal 20 cooperate with each other to execute a search using the trained NER model $M_{ner}$ (Step S13), and this process is ended.

The data augmentation system 1 according to the at least one embodiment executes the training of the VAE model $M_{vae}$ based on the first search queries actually input in the past searches. The data augmentation system 1 executes the data augmentation based on the second search queries output by the trained VAE model $M_{vae}$. This enables the second search queries to be automatically generated through use of the trained VAE model $M_{vae}$, thereby saving the time and labor to prepare the second search queries. The trained VAE model $M_{vae}$ is created based on the actually input first search queries, and hence character strings that appear realistic can be used as the second search queries. While noise may increase due to the data augmentation when the data augmentation is executed through use of character strings that are unrealistic, the second search queries being realistic character strings are used to execute the data augmentation, thereby being able to execute the data augmentation with high accuracy.

Further, the data augmentation system 1 executes the data augmentation based on the second search queries stochastically or randomly output by the trained VAE model $M_{vae}$. Thus, a stochastic or random factor is included in each second search query, and hence the trained VAE model $M_{vae}$ can output a new second search query that is slightly different from the second search queries output in the past each time, thereby being able to efficiently execute the data augmentation. A large number of second search queries similar to each individual first search query can be generated, and hence the data augmentation involving a wide variety of kinds of data can be achieved.

Further, the VAE model $M_{vae}$ has the output determined stochastically or randomly with the standard normal distribution followed by the probability density function to which a latent variable conforms. The second search query output by the VAE model $M_{vae}$ becomes a character string that appears unrealistic depending on the latent variable, which is a stochastic or random factor, but with the standard normal distribution followed by the probability density function to which the latent variable conforms, it becomes easier for the second search query to fall within a range that appears realistic, thereby increasing reality of the second search query. That is, the latent variable that falls within a certain range prevents generation of a second search query that significantly differs from the first search query used during the training, and enables generation of a second search query that is similar to the first search query to some extent.

Further, the trained VAE model $M_{vae}$ uses the decoder $f_{dec}$ to generate a second search query by setting the average value in the arrays sampled from the normal distribution as the initial cell state. Thus, the VAE model $M_{vae}$ using an LSTM mechanism facilitates generation of a second search query that appears realistic, thereby increasing the accuracy of the data augmentation.

Further, the data augmentation system 1 executes the training so that, when the first search query is input to the VAE model $M_{vae}$, the third search query that is the same as the first search query is output from the VAE model $M_{vae}$. Thus, it becomes easier to keep the output from the VAE model $M_{vae}$ within a range that does not greatly deviate from the input to the VAE model $M_{vae}$, thereby facilitating the generation of a second search query that appears realistic.

Further, the data augmentation system 1 acquires, as the first search query, the fourth search query that matches the dictionary database DB3. Thus, even when the actually input fourth search query includes noise inappropriate for the training of the VAE model $M_{vae}$, the noise can be filtered through use of the dictionary database DB3, thereby increasing the accuracy of the VAE model $M_{vae}$.

Further, the data augmentation system 1 executes the training of the VAE model $M_{vae}$ based on the tag associated with each of a plurality of characters included in the first search query. This enables the generation of a second search query that appears realistic in conformity to a style of the actually input first search query.

Further, the data augmentation system 1 executes the training of the VAE model $M_{vae}$ based on the first search queries and the first attributes relating to the first named entities. Thus, it is possible to create a VAE model $M_{vae}$ that can handle a plurality of first attributes. For example, secondary search queries including various secondary named entities such as a brand name, a size, a color, and a functionality can be generated by a single VAE model $M_{vae}$.

Further, the data augmentation system 1 executes the data augmentation when it is determined that a predetermined condition is satisfied based on the second search query. Thus, even when an inappropriate second search query is output for the data augmentation, the inappropriate second search query can be filtered based on a condition defined in advance, thereby increasing the accuracy of the data augmentation.

Further, the data augmentation system 1 determines whether or not the predetermined condition is satisfied by determining whether or not the second search query has a predetermined number of characters or more. Thus, even when a second search query that is inappropriately short is output for the data augmentation, such an inappropriate second search query can be excluded, thereby increasing the accuracy of the data augmentation.

Further, the data augmentation system 1 determines whether or not the predetermined condition corresponding to the types of characters included in the second search query is satisfied. Thus, an inappropriate second search query can be excluded based on the types of characters included in the second search query, thereby increasing the accuracy of the data augmentation.

Further, the data augmentation system 1 executes the data augmentation by augmenting the training data for the NER model $M_{ner}$ based on the second search query. This can reduce the time and labor to prepare the training data for the NER model $M_{ner}$. More training data can be used to train the NER model $M_{ner}$, thereby increasing the accuracy of the NER model $M_{ner}$.

Further, the data augmentation system 1 augments the training data based on the second search query and the second attribute estimated based on the temporarily created NER model $M_{ner}$. This can reduce the time and labor to assign the second attribute to the second search query.

Further, the data augmentation system 1 estimates the second attribute based on the NER model $M_{ner}$ that has learned the training data including the first search query and the first attribute. The NER model $M_{ner}$ that has temporarily been created is not highly accurate enough to handle an unknown search query, but when the second search query has features similar to those of the first search query, the second attribute can be estimated with high accuracy to some extent. Thus, the second attribute can be estimated from the second search query with some degree of accuracy, thereby being able to reduce the time and labor to assign the second attribute to the second search query.

Further, the data augmentation system 1 executes the additional training of the trained NER model $M_{ner}$ based on new training data output through the data augmentation. This can save the time and labor to create the training data for the NER model $M_{ner}$. More training data can be used to train the NER model $M_{ner}$, thereby increasing the accuracy of the NER model $M_{ner}$.

5. Modification Examples

The present disclosure is not limited to the example of the at least one embodiment described above, and can be modified suitably without departing from the spirit of the present disclosure.

5-1. Modification Example 1

For example, the data augmentation module 307 may execute the data augmentation by augmenting training data for a third model, which is different from the VAE model $M_{vae}$, based on the second search query. The third model may be the NER model $M_{ner}$ described in the at least one embodiment, but is assumed to be another model in this case. That is, the third model is a superordinate concept including the second model exemplified by the NER model $M_{ner}$. The data augmentation system 1 can be used for the data augmentation of some machine learning model other than the NER model $M_{ner}$.

It suffices that the third model is a model that uses the second search query as the training data, and can be used for any purpose. As a machine learning method for the third model, it is possible to use any one of the methods enumerated as examples in the description of the first model or the second model. For example, the third model may be a model that estimates an attribute (for example, age group, gender, or hobby) of the user who has input the second search query. In this case, the third model is caused to learn training data including pairs of the second search query and the attribute of the user. For example, the third model may be a model that determines a genre of an advertisement to be included in search results corresponding to the second search query. In this case, the third model is caused to learn training data including pairs of the second search query and the genre of the advertisement.

The data augmentation system 1 according to Modification Example 1 executes the data augmentation by augmenting the training data for the third model, which is different from the VAE model $M_{vae}$, based on the second search query. This can reduce the time and labor to prepare the training data for the third model. More training data can be used to train the third model, thereby increasing the accuracy of the third model.

5-2. Modification Example 2

For example, the acquisition module 302 may acquire the first search query that was actually input in a search executed during a specific period in the past. The specific period is a part of the period in the past. For example, the specific period may be the most recent week, month, or year. Instead of the most recent period, the specific period may be a period from a first time point in the past until a second time point in the past after the first time point (for example, may be the year 2021 assuming that the current time point is in June 2022). Any period may be designated as the specific period. For example, a time point at which the first search query was input is identified by the search date and time in the search history database DB2. The acquisition module 302 acquires only the first search query having the search date and time included in the specific period.

The data augmentation system 1 according to Modification Example 2 acquires the first search query that was actually input in the search executed during the specific period in the past. Thus, it is possible to achieve the data augmentation corresponding to a trend during the specific period. For example, it is possible to generate a realistic second search query similar to a recently popular keyword.

5-3. Modification Example 3

For example, the data augmentation system 1 can be used for any other service different from the search service. For example, the data augmentation system 1 may be used for a search for another service such as an electronic commerce service, a travel booking service, an electronic payment service, a financial service, a communication service, or a content distribution service. In Modification Example 3, a case in which the data augmentation system 1 is used for an electronic commerce service is described.

For example, in Modification Example 3, the search is a search for a product in an electronic commerce service. The search server 10 provides the electronic commerce service. The search target is a product in the electronic commerce service. In the search target database DB1, a URL of a product page for displaying information relating to the product and an index of the product are stored in association with each other. This index is a title of the product page, a named entity relating to the product, or an attribute relating to the product.

In Modification Example 3, the first search query is a search query actually input in the electronic commerce service. The second search query includes the second named entity relating to a virtual product. The details indicated by the first search query and the second search query are different from those in the at least one embodiment, but processing itself for generating the second search query is the same as that in the at least one embodiment. The VAE model $M_{vae}$ generates secondary search queries for fictitious products that appear to be real products.

The data augmentation system 1 according to Modification Example 3 can efficiently achieve the data augmentation for the electronic commerce service.

5-4. Other Modification Examples

For example, the modification examples described above may be combined with one other.

For example, in the at least one embodiment, the case of augmenting the training data for the NER model $M_{ner}$ has been taken as an example, but other data augmentation may be executed based on the second search query. For example, the dictionary database DB3 may be augmented based on the second search query. In addition, for example, when knowledge (corpus) relating to a search query is required for some purpose, not only the first search query actually input but also virtual second search queries may be added to increase the knowledge, to thereby execute the data augmentation. That is, the data augmentation system 1 can be used for other data augmentation different from the purpose of increasing training data for machine learning.

For example, the first model is not required to be a model having the output determined stochastically or randomly. In this case, the first search query and some noise data may be input to the first model, and the first model may generate a second search query formed of a combination thereof. The noise data may be generated at random or prepared in advance by the creator. For example, when the second attribute is not particularly used, the second attribute of the second search query is not required to be estimated. The second search query can be used for various purposes, and may be used not only for the search but also for a reference purpose such as marketing or naming.

For example, the functions relating to the data augmentation described as being implemented by the learning terminal 30 may be implemented by the search server 10 or another computer, or may be shared among a plurality of computers. For example, the data described as being stored in the data storage unit 300 may be stored in a database server.

What is claimed is:

1. A data augmentation system, comprising at least one processor configured to:
    acquire a first search query including a first named entity, which was actually input in a search executed in a past;
    execute training of a first model that outputs a second search query including a virtual second named entity, which is different from the first named entity, based on the first search query;
    execute data augmentation based on the second search query output by the trained first model;
    wherein the first model comprises a model having output determined in one of a stochastic manner or a random manner,
    wherein the at least one processor is configured to execute the data augmentation based on the second search query output in one of the stochastic manner or the random manner by the trained first model;
    wherein the first model comprises a variational auto-encoder (VAE) model having output determined in one of the stochastic manner or the random manner with a standard normal distribution followed by a probability density function to which a latent variable conforms,
    wherein the at least one processor is configured to execute the data augmentation based on the second search query output in one of the stochastic manner or the random manner by the trained VAE model;
    wherein the VAE model includes:
        an encoder configured to learn mapping from the first search query input during the training to an array of a cell state of a long short-term memory (LSTM) assumed to be a normal distribution;
        a decoder configured to learn mapping from an average value of the cell state in the array to a third search query output during the training,
    wherein the first model is configured to cause the decoder to generate the second search query by setting the average value in the array sampled from the normal distribution as an initial cell state; and
    wherein the second search query includes a fictitious word or phrase which does not exist in reality.

2. The data augmentation system according to claim 1, wherein the at least one processor is configured to execute the training so that, when the first search query is input to the first model, a third search query that is the same as the first search query is output from the first model.

3. The data augmentation system according to claim 1, wherein the at least one processor is configured to:
    compare each of a plurality of fourth search queries actually input in the search to a dictionary database relating to the first named entity; and
    acquire, as the first search query, each of the plurality of fourth search queries that matches the dictionary database.

4. The data augmentation system according to claim 1, wherein the first search query includes a plurality of characters,
    wherein each of the plurality of characters is associated with a tag relating to the first named entity, and wherein the at least one processor is configured to execute the training based on the tag associated with each of the plurality of characters.

5. The data augmentation system according to claim 1, wherein the first search query is associated with a first attribute relating to the first named entity, and
wherein the at least one processor is configured to execute the training based on the first search query and the first attribute.

6. The data augmentation system according to claim 1, wherein the at least one processor is configured to:
determine whether a predetermined condition is satisfied based on the second search query; and
execute the data augmentation when it is determined that the predetermined condition is satisfied.

7. The data augmentation system according to claim 6, wherein the at least one processor is configured to determine whether the predetermined condition is satisfied by determining whether the virtual second named entity included in the second search query has a predetermined number of characters or more.

8. The data augmentation system according to claim 6, wherein the at least one processor is configured to determine whether the predetermined condition corresponding to types of characters in the virtual second named entity included in the second search query is satisfied.

9. The data augmentation system according to claim 1, wherein the at least one processor is configured to execute the data augmentation by augmenting training data for a second model that recognizes a fifth named entity included in a fifth search query based on the second search query.

10. The data augmentation system according to claim 9, wherein the at least one processor is configured to:
estimate a second attribute relating to the virtual second named entity based on the second model that has learned the training data; and
augment the training data based on the second search query and the second attribute.

11. The data augmentation system according to claim 10, wherein the training data includes the first search query and a first attribute relating to the first named entity, and
wherein the at least one processor is configured to estimate the second attribute based on the second model that has learned the training data including the first search query and the first attribute.

12. The data augmentation system according to claim 9, wherein the at least one processor is configured to execute additional training of the second model that has learned the training data based on new training data output through the data augmentation.

13. The data augmentation system according to claim 1, wherein the at least one processor is configured to execute the data augmentation by augmenting training data for a third model, which is different from the first model, based on the second search query.

14. The data augmentation system according to claim 1, wherein the at least one processor is configured to acquire the first search query that was actually input in the search executed during a specific period in the past.

15. The data augmentation system according to claim 1, wherein the search comprises a search for a product in an electronic commerce service,
wherein the first search query comprises a search query actually input in the electronic commerce service, and
wherein the second search query includes the virtual second named entity relating to a virtual product.

16. The data augmentation system according to claim 1, wherein the second search query represents fictitious words.

17. The data augmentation system according to claim 1, wherein the second search query represents fictitious phrases.

18. A data augmentation method, comprising:
acquiring a first search query including a first named entity, which was actually input in a search executed in a past;
executing training of a first model that outputs a second search query including a virtual second named entity, which is different from the first named entity, based on the first search query; and
executing data augmentation based on the second search query output by the trained first model;
wherein the first model comprises a model having output determined in one of a stochastic manner or a random manner,
wherein executing the data augmentation is based on the second search query output in one of the stochastic manner or the random manner by the trained first model;
wherein the first model comprises a variational auto-encoder (VAE) model having output determined in one of the stochastic manner or the random manner with a standard normal distribution followed by a probability density function to which a latent variable conforms,
wherein executing the data augmentation is based on the second search query output in one of the stochastic manner or the random manner by the trained VAE model;
wherein the VAE model includes:
an encoder configured to learn mapping from the first search query input during the training to an array of a cell state of a long short-term memory (LSTM) assumed to be a normal distribution;
a decoder configured to learn mapping from an average value of the cell state in the array to a third search query output during the training,
wherein the first model is configured to cause the decoder to generate the second search query by setting the average value in the array sampled from the normal distribution as an initial cell state; and
wherein the second search query includes a fictitious word or phrase which does not exist in reality.

19. A non-transitory information storage medium having stored thereon a program for causing a computer to:
acquire a first search query including a first named entity, which was actually input in a search executed in a past;
execute training of a first model that outputs a second search query including a virtual second named entity, which is different from the first named entity, based on the first search query; and
execute data augmentation based on the second search query output by the trained first model;
wherein the first model comprises a model having output determined in one of a stochastic manner or a random manner,
wherein the program causes the computer to execute the data augmentation based on the second search query output in one of the stochastic manner or the random manner by the trained first model;
wherein the first model comprises a variational auto-encoder (VAE) model having output determined in one of the stochastic manner or the random manner with a standard normal distribution followed by a probability density function to which a latent variable conforms, wherein the program causes the computer to execute the data augmentation based on the second search query output in one of the stochastic manner or the random manner by the trained VAE model;

wherein the VAE model includes:
- an encoder configured to learn mapping from the first search query input during the training to an array of a cell state of a long short-term memory (LSTM) assumed to be a normal distribution;
- a decoder configured to learn mapping from an average value of the cell state in the array to a third search query output during the training, wherein the first model is configured to cause the decoder to generate the second search query by setting the average value in the array sampled from the normal distribution as an initial cell state; and wherein the second search query includes a fictitious word or phrase which does not exist in reality.

* * * * *